United States Patent
Kawamura et al.

(10) Patent No.: US 7,092,024 B2
(45) Date of Patent: Aug. 15, 2006

(54) ELECTRONIC CAMERA HAVING PEN INPUT FUNCTION

(75) Inventors: Tomoaki Kawamura, Kawasaki (JP); Satoshi Ejima, Setagya (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 754 days.

(21) Appl. No.: 09/963,545

(22) Filed: Sep. 27, 2001

(65) Prior Publication Data

US 2002/0008763 A1 Jan. 24, 2002

Related U.S. Application Data

(63) Continuation of application No. 08/717,293, filed on Sep. 20, 1996, now abandoned.

(30) Foreign Application Priority Data

Sep. 21, 1995 (JP) ................................ 7-243276

(51) Int. Cl.
*H04N 5/222* (2006.01)
*H04N 5/76* (2006.01)

(52) U.S. Cl. ................... 348/333.12; 348/333.02; 348/231.6

(58) Field of Classification Search ........... 348/207.99, 348/231.99, 231.1, 231.6, 231.9, 239, 333.01, 348/333.03, 333.12; 345/173, 174, 175, 345/179, 180, 181
See application file for complete search history.

(56) References Cited

U.S. PATENT DOCUMENTS

| | | | |
|---|---|---|---|
| 4,831,568 A | 5/1989 | Ito | |
| 4,837,628 A | 6/1989 | Sasaki | |
| 4,935,809 A | 6/1990 | Hayashi et al. | |
| 5,239,419 A | 8/1993 | Kim | |
| 5,301,240 A | 4/1994 | Stockum et al. | |
| 5,311,207 A | 5/1994 | Kusumoto et al. | |
| 5,526,023 A * | 6/1996 | Sugimoto et al. | 345/173 |
| 5,589,857 A | 12/1996 | Tanahashi et al. | |
| 5,642,134 A * | 6/1997 | Ikeda | 345/174 |
| 5,644,339 A * | 7/1997 | Mori et al. | 345/173 |
| 5,671,014 A | 9/1997 | Ito et al. | |
| 5,727,112 A | 3/1998 | Kellar et al. | |
| 5,729,289 A | 3/1998 | Etoh | |
| 5,796,428 A * | 8/1998 | Matsumoto et al. | 348/207.99 |

FOREIGN PATENT DOCUMENTS

JP 7-182095 7/1994

* cited by examiner

*Primary Examiner*—David Ometz
*Assistant Examiner*—Luong T. Nguyen
(74) *Attorney, Agent, or Firm*—Oliff & Berridge PLC

(57) ABSTRACT

An electronic camera of the present invention includes an imaging element that forms an image of an object, a display device that displays the formed image; a memory that stores the image formed by the imaging element; and a designating device that designates arbitrary positions on a display screen of the display device.

16 Claims, 11 Drawing Sheets

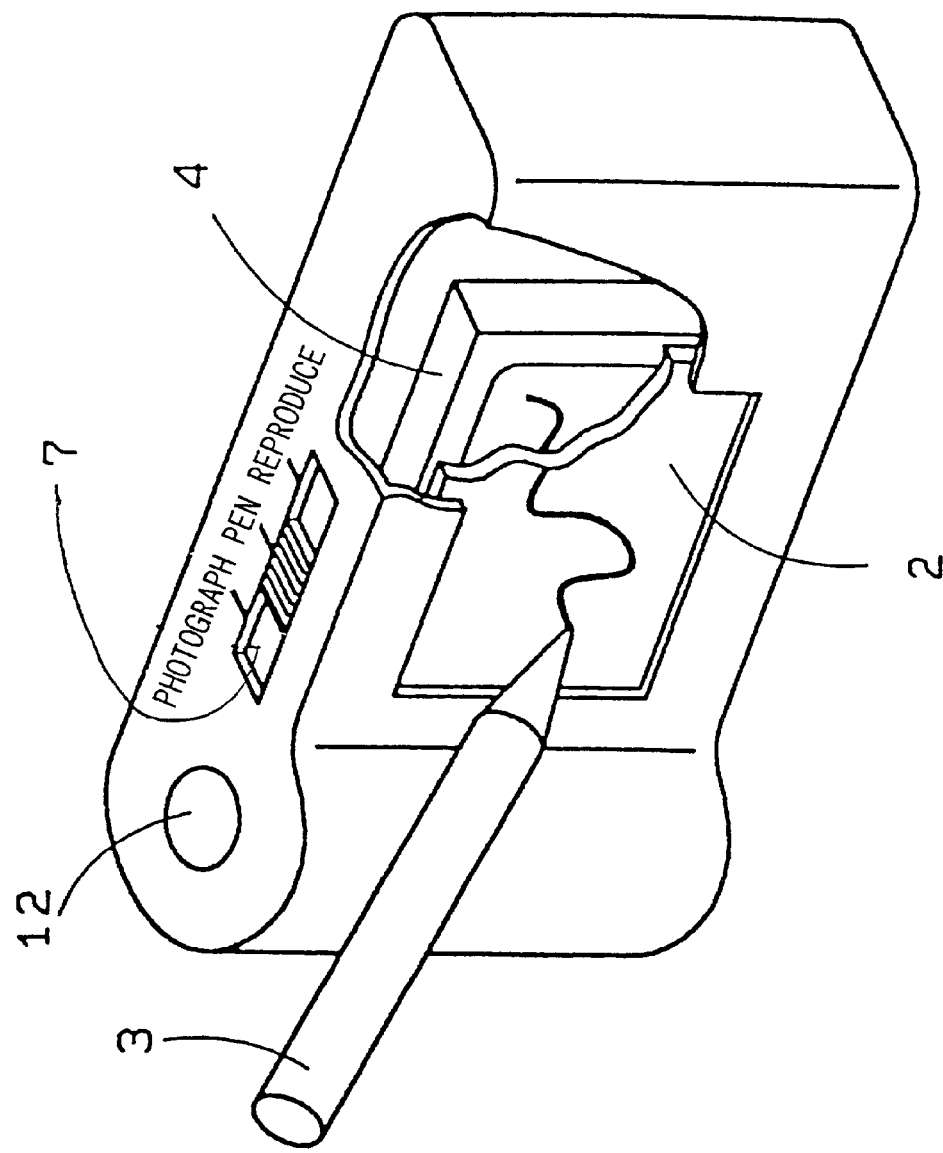

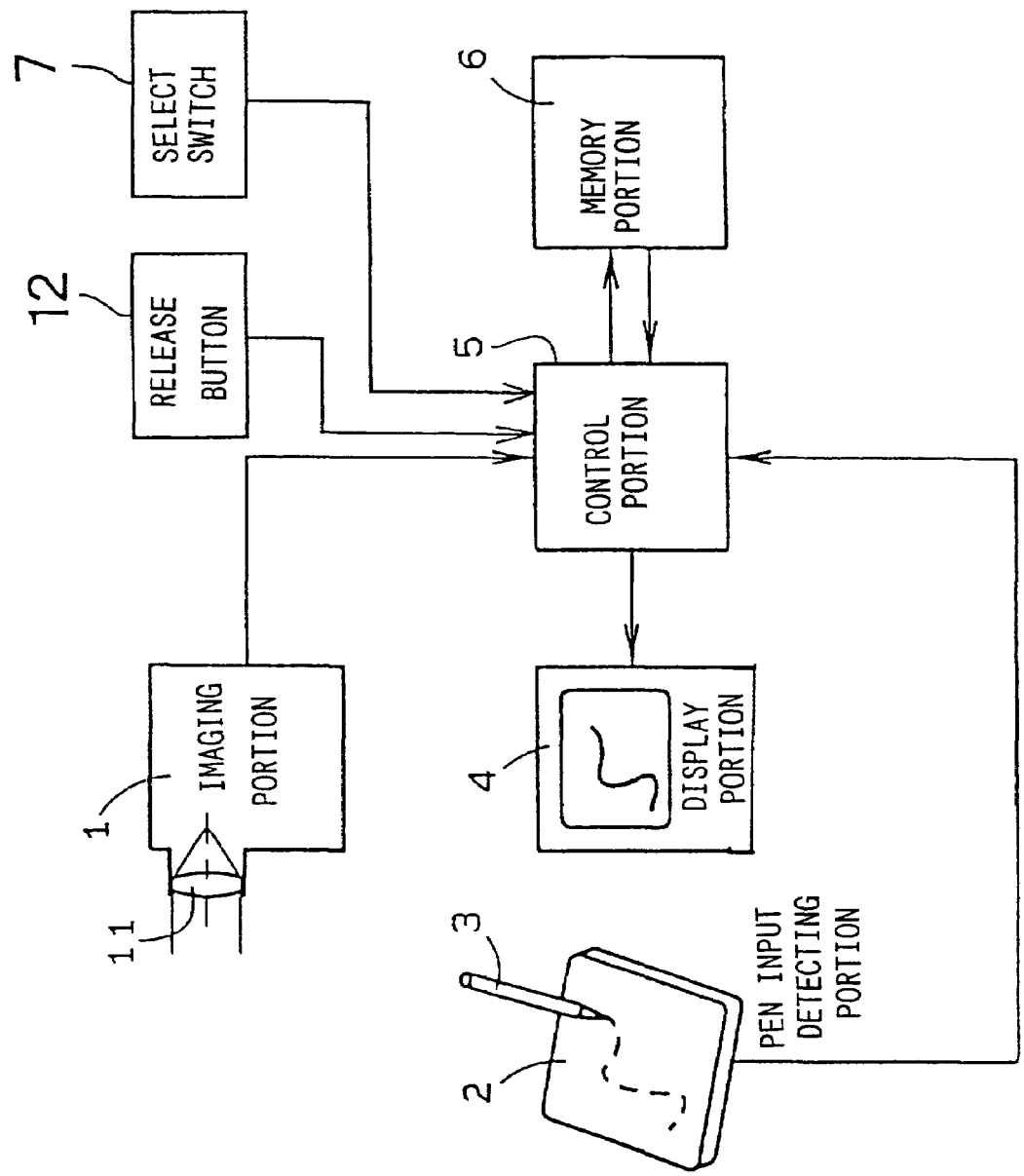

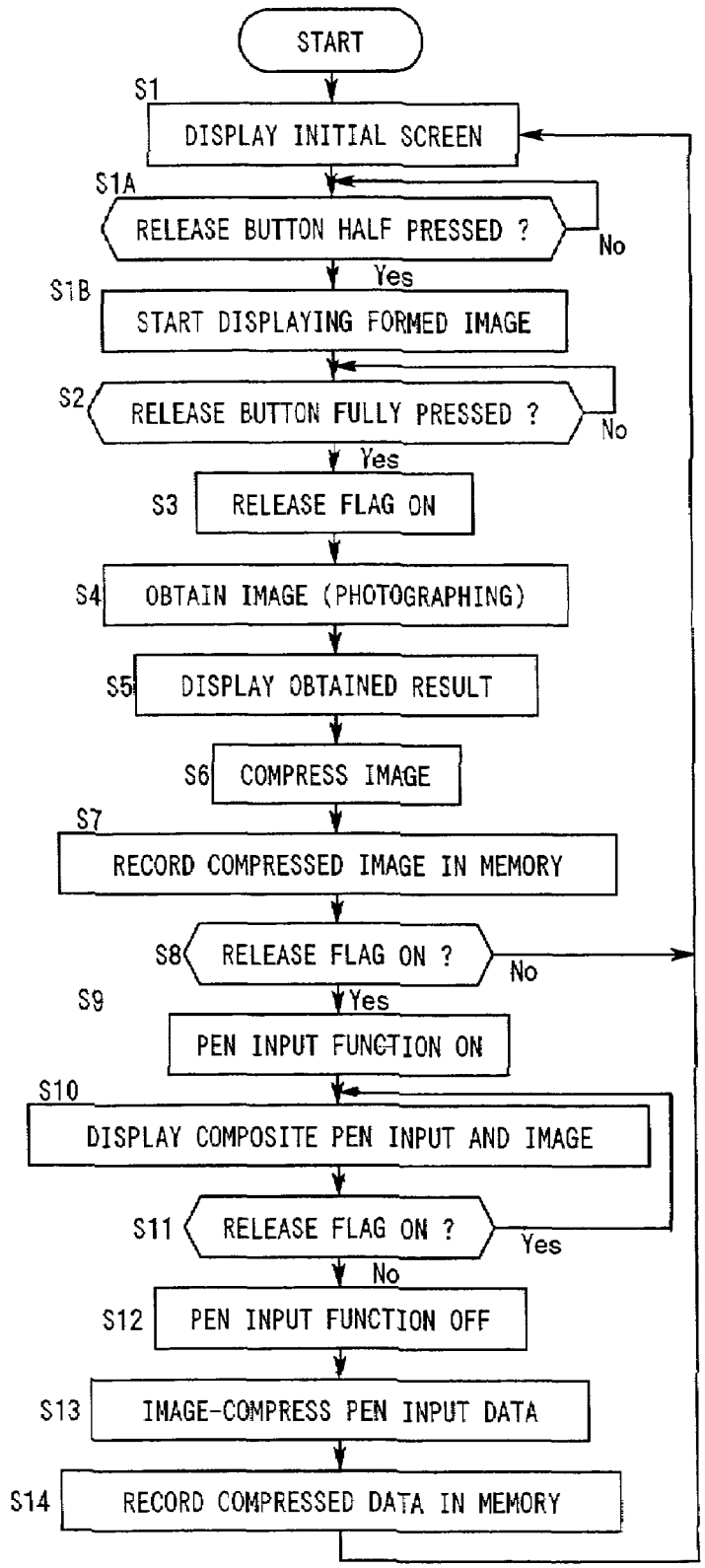

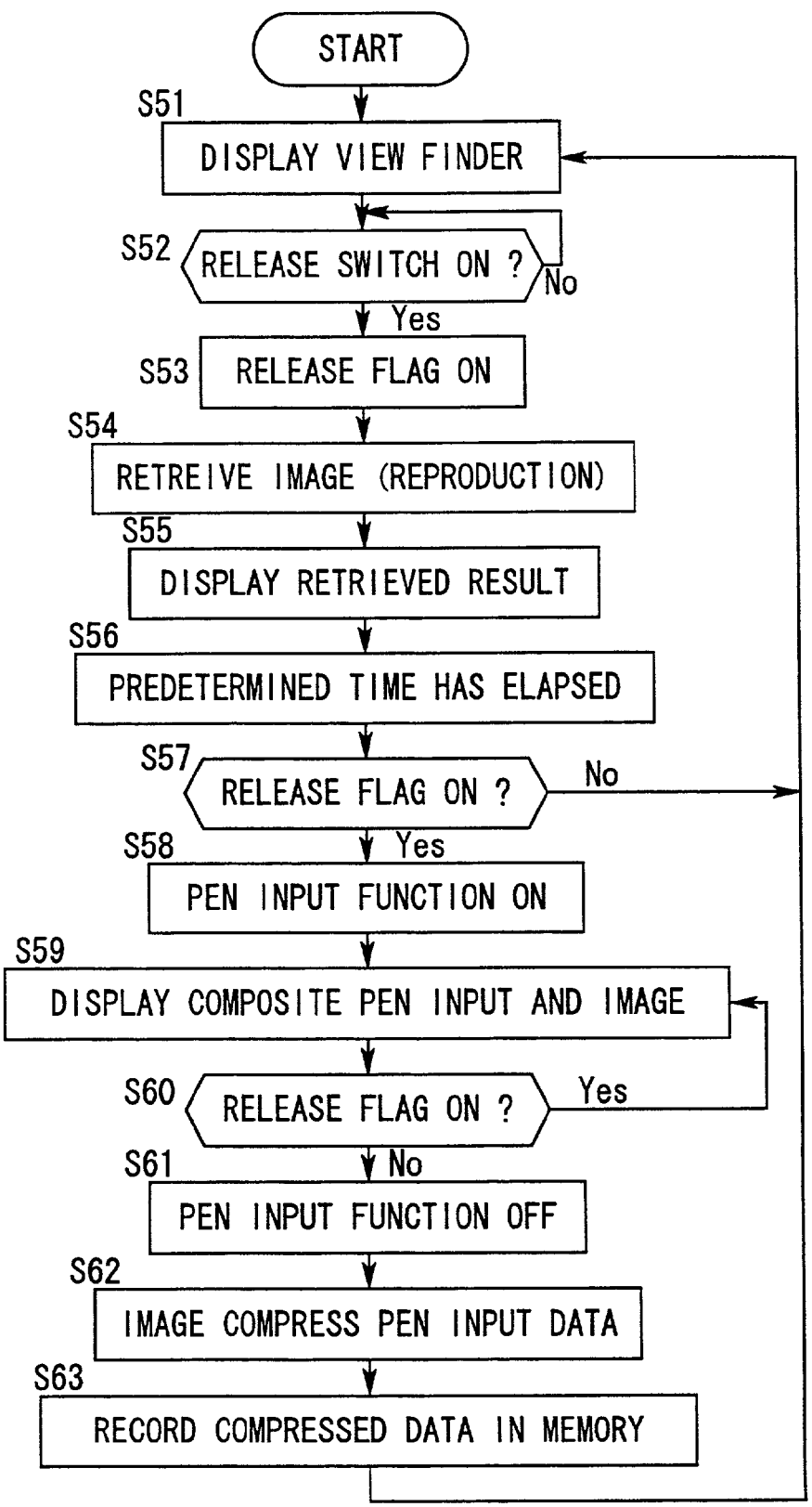

ELECTRONIC CAMERA HAVING PEN INPUT FUNCTION

This is a Continuation of application Ser. No. 08/717,293 filed Sep. 20, 1996 now abandoned.

BACKGROUND OF THE INVENTION

1. Field of the Invention

The present invention relates to an electronic camera.

2. Description of Related Art

In the field of electronic cameras for converting a photographed image into a digital image and recording the digital image on a recording medium, such as a memory card, there is widely known a camera in which information related to photographing, such as date, can be recorded with respect to each photographic film frame.

In the conventional electronic camera, however, the information related to photographing is generally entered using a switch, command dial or the like, which does not necessarily ensure a high operating efficiency. Further, the switch, command dial or the like needs to be additionally provided, or a switch having other function needs to be shared for the above purpose.

SUMMARY OF THE INVENTION

An object of the present invention is to provide an electronic camera provided with data entry function by means of a pen-type designator.

To accomplish the above object, an electronic camera according to one aspect of the present invention comprises: an imaging element that forms an image of an object; a display device that displays the formed image; a memory that stores the image formed by the imaging element; and a designating device that designates arbitrary positions on a display screen of the display device.

An electronic camera according to another aspect of the present invention comprises: an imaging element that converts an optical image that passes through a photographing lens into a digital image by operating a release switch to an ON state; a display device capable of displaying the digital image; a pen-type designator capable of designating an arbitrary position on a display screen of the display device; a pen position detecting device that detects the position designated by the pen-type designator; a pen trail display controller that causes the display device to display a movement trail of the detected designated position; and a pen detection controller that inhibits the imaging element from forming an image of a next frame and allows the pen position detecting device to detect the designated position and allows the pen trail display controller to control display of the movement trail, while the release switch is kept operated to the ON state after the imaging element terminates forming an image of one frame, the pen detection controller enabling the imaging element to effect forming an image of the next frame when the release switch is thereafter operated to an OFF state.

BRIEF DESCRIPTION OF THE DRAWINGS

FIG. 1A is a perspective view showing an electronic camera having a pen input function according to the first embodiment, as viewed from the back side of the camera;

FIG. 2 is a block diagram showing the main construction of the electronic camera of FIG. 1;

FIG. 3 is a flow chart showing the processing operation of the electronic camera of the first embodiment;

FIG. 4 is a flow chart showing the processing operation of an electronic camera of the second embodiment;

DESCRIPTION OF THE PREFERRED EMBODIMENTS

First Embodiment

There will be described the first embodiment of the present invention, referring to FIG. 1A through FIG. 3.

Figure 1B:
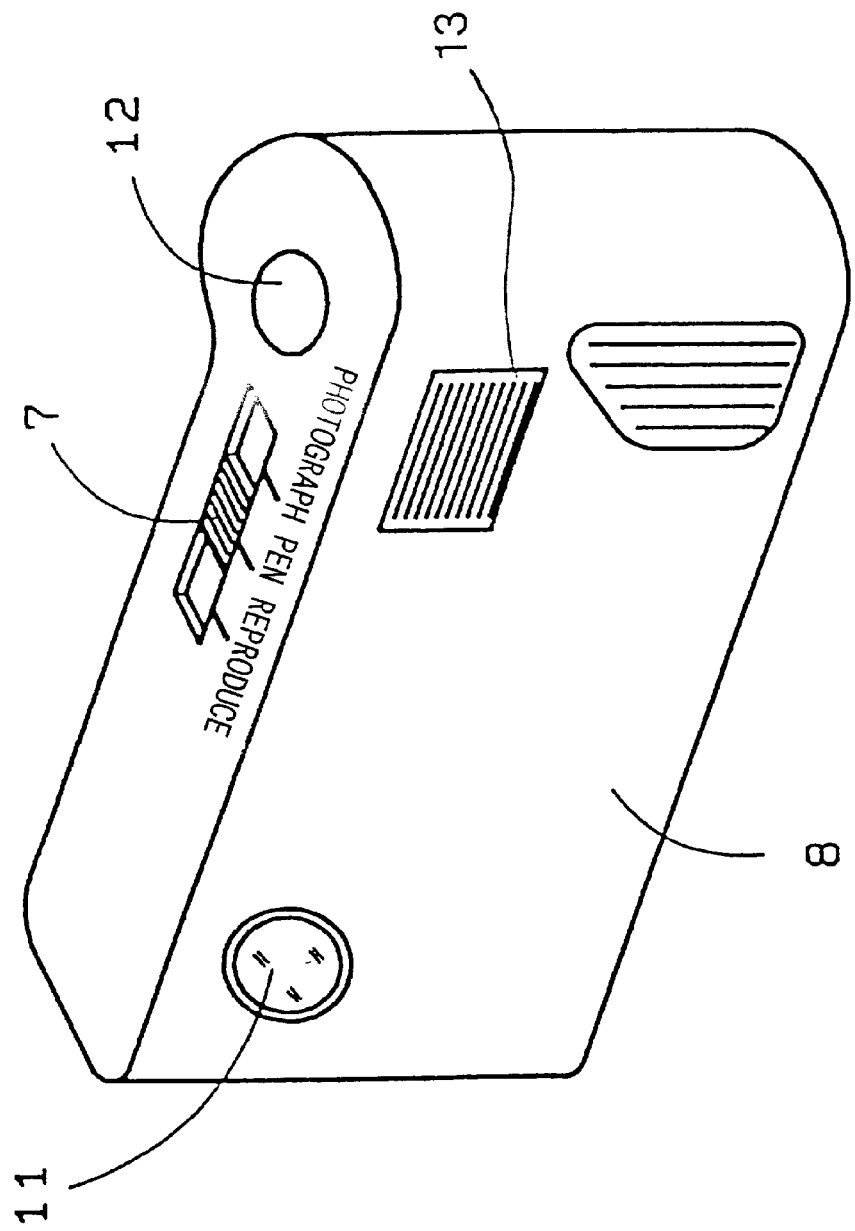
FIG. 1B is a perspective view showing an electronic camera having the pen input function according to the first embodiment, as viewed from the front side of the camera.

FIGS. 1A and 1B are perspective views of an electronic camera having the pen input function, as viewed from the back side and the front side of the camera, respectively. In FIG. 1A, a pen input detecting portion 2 consists of a touch panel (touch tablet) and others. As known in the art, the touch panel consists of two layers of transparent electrodes and detects the position of a pressed point at which the two electrode layers are in contact with each other, or detects the position of a contact point by detecting a change in the capacitance at the point. Display portion 4 is positioned inside the pen input detecting portion 2 (the side toward the front side of the camera). The display portion 4 consists of a liquid crystal display (LCD), for example, and a camera user can view a display screen of the display portion 4 from the back side of the camera, through the pen input detecting portion 2.

Select switch 7 is operated to select one of the following modes: a photographing mode in which an object is photographed, a pen input mode that permits data entry with a pen, and a reproduction mode in which the display portion 4 displays photographed image data that are recorded in a memory portion 6 or detachable PC card memory portion 6 which will be described later. When the select switch 7 is operated to the pen input mode, a trail of a pen-shaped pointer 3 is superposed on the photographed image, and outputted on the display portion 4 in real-time operation. Thus, desired data can be entered through the pen-shaped pointer 3 as if they were drawn with ink. If the select switch 7 is operated to the photographing mode, an image of an object obtained through a photographing lens 11 (FIG. 1B) appears in the display portion 4. If a release button 12 is pressed in this condition, the image that appears at this moment is recorded in the memory portion 6. In the case where a background is dark, flash light is emitted by an electronic flash device (strobe) 13 (FIG. 1B).

FIG. 2 is a block diagram showing the construction of a main portion of the electronic camera of FIG. 1A and FIG. 1B. When the select switch 7 is operated to the photographing mode, the imaging portion 1 starts forming an image when the release button 12 is half pressed, and the image taken by the photographing lens 11 is converted into electric signals by means of CCD (photoelectric converting device) that is not shown in the figure, and received by a control portion 5 that performs image processing and others, through a sampling hold circuit and AD converter that are not shown in the figure. The control portion 5 incorporates a buffer (not shown) for temporarily storing the image that has been just photographed, and displays the image in the display portion 4. The control portion 5 also performs image processing, such as JPEG compression, with respect to an image taken at the point of time when the release button 12 is fully pressed, and the processed image is recorded in the memory portion 6. The control portion 5 consists of a microprocessor and peripheral equipment, and performs the above-described image processing and other controls of the electronic camera.

When the select switch 7 is operated to the reproduction mode, the control portion 5 reads the image recorded in the memory portion 6, and displays the image in the display portion 4. When the select switch 7 is operated to the pen input mode, the movement trail of the pen detected by the pen input detecting portion 2 is displayed in the display portion 4 irrespective of whether the photographed image is displayed in the display portion 4 or not. When the photographed image is displayed in the display portion 4, therefore, the trail of the pen-shaped pointer 3 is displayed as it is superposed on the photographed image.

The electronic camera of the present embodiment as described above is often used in a manner in which information related to photographing of one frame is entered through the pen-shaped pointer 3 after completion of photographing with respect to that frame. In such cases, however, it takes trouble to operate the select switch 7 each time photographing is followed by pen data entry and pen data entry is followed by photographing. In view of this, a control routine of FIG. 3 is executed in the present embodiment so as to save trouble in operating the select switch 7.

FIG. 3 is a flow chart showing a part of the operation of the electronic camera when the select switch 7 is operated to the photographing mode. The operation of the first embodiment will be described referring to this flow chart. In step S1 of FIG. 3, an initial screen is displayed in the display portion 4 when a power supply switch of the electronic camera is turned on, while waiting for the release button 12 to be operated. In step S1A, it is determined whether the release button 12 is half pressed or not. The control flow goes to step S1B when the button 12 is half pressed, and stays in step S1A if the button 12 is not half pressed. Namely, this step S1A indicates that the camera is on standby for the operation of the camera user. Even if the release button 12 is fully pressed at a time, these steps are executed since the button 12 must go through a half-pressed state.

In step S1B, the imaging portion 1 starts forming an image of an object, and the formed image is converted into a digital image and then displayed in the display portion 4. At this time, the display portion 4 functions as a view finder. In step S2, it is determined whether the release button 12 is fully pressed (a release switch is turned on, in other words release is ON) or not. The control flow stays at step S2 if the release switch is in the OFF state, and goes to step S3 if the switch is turned ON. In step S3, a release flag is set to ON. This release flag is a flag for judging whether pen data entry is acceptable or not, and the ON state of this flag indicates that the pen data entry is acceptable. And also, this release flag is maintained in the ON state while the release button 12 is being pressed, and placed in the OFF state once a hand is released from the release button 12.

In step S4, the digital image of the object image taken at the point of time when the release switch is turned ON is obtained and fixed by the control portion 5, and the fixed digital image is displayed in the display portion 4 in step S5. In step S6, the obtained and fixed digital image is subjected to image compression processing in the control portion 5, and the result is recorded in the memory portion 6 in step S7.

In step S8, it is determined whether the above-described release flag is ON or not. The control flow goes back to step S1 when the flag is OFF, and goes to step S9 when the flag is ON. The ON state of the release flag indicates that the release button 12 is kept pressed even after the release switch is turned ON. In this case, the pen input processing is effected by executing steps S9–S14 as described below.

In step S9, the pen input function is turned ON. More specifically, a signal is fed to the pen input detecting portion 2, to start processing for detecting coordinate positions at which the user enters data with a pen or the like. In step S10, characters or others entered with the pen are converted into image data based on the coordinate positions detected by the pen input detecting portion 2, and displayed such that the image data are superposed on photographed image data that are currently displayed. In step S11, it is determined again whether the release flag is ON or not. This determination is made in order to determine whether data entry with the pen has been completed or not. Since the release flag is turned OFF at the point of time when the user releases his/her hand from the release button 12 after the pen data entry is finished, it is possible to know whether the pen data entry is finished or not by detecting whether the release flag is ON or not.

If it is determined in step S11 that the release flag is ON, the control flow goes back to step S10 to continue detection of the trail of the pen-shaped pointer 3. If it is determined that the release flag is OFF, the control flow goes to step S12 to turn OFF the pen input function. As a result, the pen input detecting portion 2 stops detecting the pen coordinate positions. In step S13, the image data entered through the pen-shaped pointer 3 is compressed by the control portion 5, and the compressed data is stored in the memory portion 6 in step S14.

When the pen input data are stored in the memory portion 6 in step S14, the input data are related to the photographed image data previously stored in the memory portion 6. When the photographed image data is given a name "950831000010", for example, the pen input data maybe given a file name "950831000011". With the pen input data related to the photographed image data, both of these data can be superposed on each other again and displayed when they are reproduced later or when the data are transferred to an external computer to be further processed. Upon completion of the processing of step S14, the control flow goes back to step S1 and then proceeds to step S1A to place the camera on standby for the operation by the user. Namely, the initial screen is displayed on the display portion 4 while waiting for the operation to half press the release button 12.

In the first embodiment as described above, the camera user can utilize the pen input function to arbitrarily enter trails directed by the pen-shaped pointer 3, such as hand-written characters or drawings, thus making it possible for the electronic camera to receive a wide variety of information.

When the release button 12 is kept fully pressed after the release button 12 is fully pressed, the camera is automatically switched to a condition in which data can be entered with the pen, thus eliminating a need to operate the select switch 7 to switch the modes before the data entry is effected. As a result the operability is improved. Further, the pen input function is automatically turned OFF once the user releases the hand from the release button upon completion of the data entry with the pen, thus allowing the user to prepare for the next photographing immediately after the pen data entry, and eliminating a possibility of missing a chance to release the shutter. Namely, according to the first embodiment, the pen input function can be selectively turned ON or not by selecting whether the release button 12 that is always operated upon photographing is kept operated or not, thereby eliminating a possibility for the user to hesitate as to how to operate, and thus assuring improved operating efficiency. While the pen is employed as input means, it may be replaced by other input means, such as a trackball or a mouse.

Second Embodiment

In the second embodiment, the pen input function is automatically set to the ON state when photographed image data that have been photographed and stored in a memory, a memory card or the like are reproduced. The construction of the second embodiment is the same as that of the first embodiment, and thus will not be explained. In the following, the operation of the second embodiment will be described referring to a flow chart of FIG. 4. In this embodiment, the power supply of the electronic camera is turned ON while the select switch 7 is placed in the reproduction mode.

In step S51 of FIG. 4, when the power supply switch of the electronic camera is turned ON, photographed image data which correspond to a plurality of frames among photographed image data stored in the memory portion 6 are displayed on the display portion 4 at the same time in order starting from the latest photographed image data, while waiting for the release button 12 to be operated. Namely, this step S51 indicates that the camera is on standby for a command for reproduction. In this step S51, the photographed image data of respective frames are displayed in reduced size (so-called thumbnail display) so that the image data corresponding to the plurality of frames can be displayed at the same time.

In step S52, it is determined whether the release button 12 is fully pressed (the release switch is turned ON) or not. The control flow stays at step S52 if the release switch is OFF, and goes to step S53 if the switch is turned ON. In step S53, the release flag is set to ON. In step S54, the latest frame (that has been photographed most lately) is determined as a frame to be reproduced, and the photographed image data corresponding to this frame is retrieved from the memory portion 6. In step S55, the latest photographed image data is displayed in enlargement over the entire display screen of the display portion 4.

In step S56, it is determined whether a predetermined period of time (e.g., 1 to 2 seconds) has elapsed since the reproduction display started in step S54. Upon a lapse of the predetermined time, the control flow goes to step S57 to determine whether the release flag is ON or not. When the release flag is ON, which means that the release button 12 is kept being pressed, the control flow goes to step S58 to actuate the pen input function, and steps S58 to S63 are subsequently executed to effect the same processing as conducted in steps S9 to S14 of FIG. 3.

In this manner, the photographed image data that are currently reproduced are displayed such that the image data entered with the pen-shaped pointer 3 are superposed on the photographed image data, and the photographed image data that are being reproduced and the pen input image data are stored in the memory portion 6 such that these data are correlated with each other. When the photographed image data and pen input image data are displayed as they are superposed on each other, these two kinds of data are handled independently of each other, thus avoiding loss of independence of the data even if they are superposed on each other and displayed.

Thus, in the second embodiment, various kinds of image information related to the photographed image data that are being reproduced can be entered with the pen-shaped pointer 3, and stored in the memory portion 6 or the like such that the input image data thus entered are correlated with the photographed image data. Further, the select switch 7 need not be operated by the operator since the pen input function can be actuated only by keeping the release button 12 pressed.

Third Embodiment

The third embodiment permits switching of respective modes, i.e., pen input mode, photographing mode and reproduction mode, without providing the select switch 7 shown in FIG. 1A.

Figure 5:
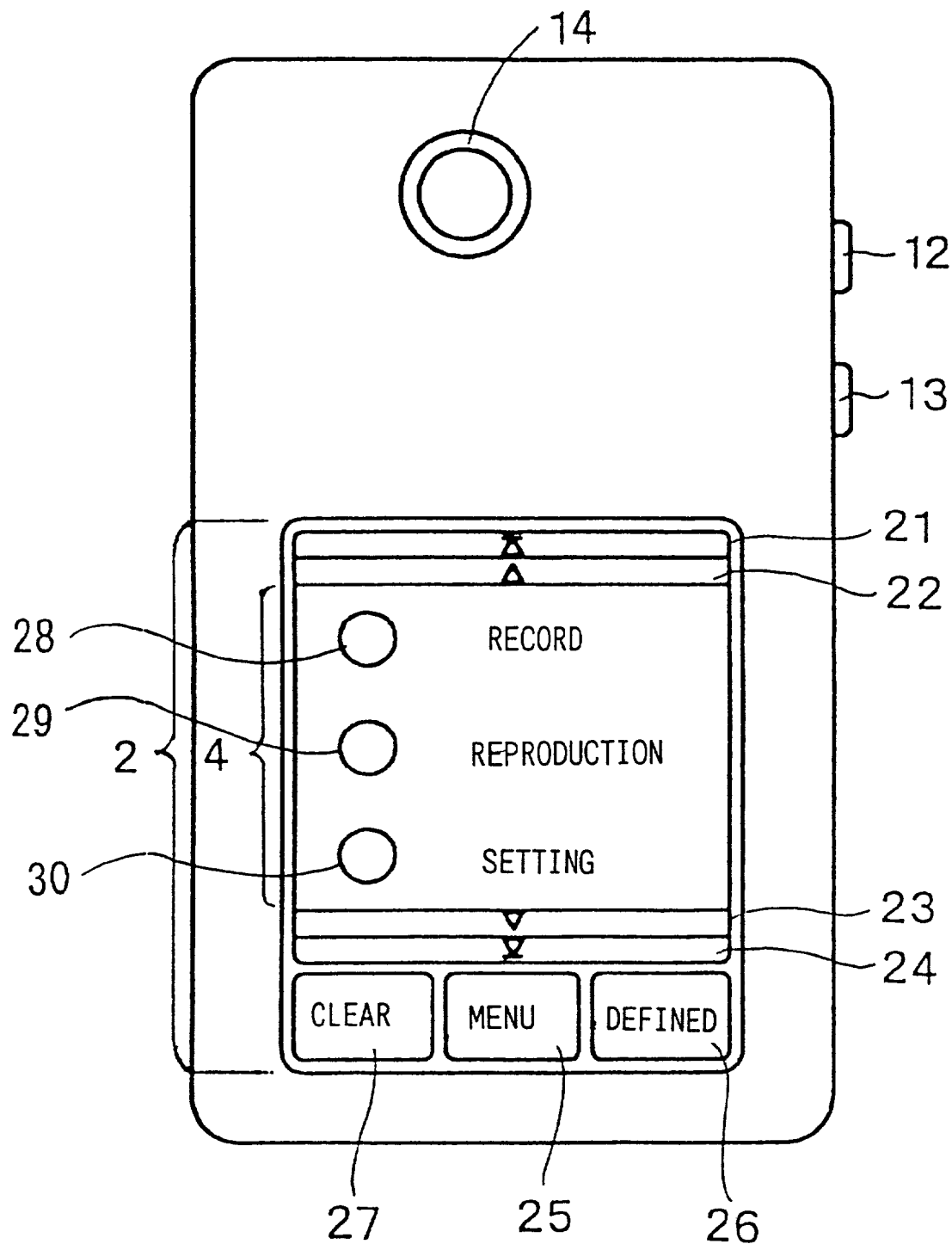
FIG. 5 is a view showing an example of image displayed when a menu button is pressed in an electronic camera of the third embodiment.

FIGS. 5 to 9 are rear elevational views of an electronic camera according to the third embodiment. The same reference numerals as used in FIG. 1A are used for identifying corresponding elements. As shown in FIG. 5, the electronic camera of the third embodiment does not have the select switch 7 shown in FIG. 1A, but instead includes touch switches for effecting switching of various modes. The touch switches are constructed by combining the pen input detecting portion 2 with the display portion 4 and a display sheet representing the functions of the switch that are provided below the detecting portion 2. It is to be noted that the release button 12, recording button 13 and a power supply switch that is not shown are provided in the form of mechanical switches as used in the first embodiment, rather than in the form of touch switches. The electronic camera of the third embodiment is provided with an optical finder 14 that is located apart from the display portion 4. A block diagram showing the construction of the main portion of the electronic camera is the same as that of FIG. 2, except for the absence of the select switch 7 and addition of the recording button 13.

As shown in FIG. 5, the display portion 4 and a sheet in which are printed a picture representing "scroll bars", characters that read "MENU", characters that read "DEFINED" and characters that read "CLEAR" are provided below the pen input detecting portion 2. The display portion 4 consists of a liquid crystal display (LCD) as used in the first embodiment, for example. The printed sheet is combined with respective portions of the pen input detecting portion 2 that correspond to items printed in the sheet, so as to provide touch switches of scroll bars 21–24, MENU button 25, DEFINED button 26 and CLEAR button 27. For example, if the scroll bar 22 is pressed by the pen-shaped pointer 3, the image data in the display portion 4 is scrolled upwards. To the contrary, the image data in the display portion 4 is scrolled downwards if the scroll bar 23 is pressed by the pen-shaped pointer 3. If the scroll bar 21 is pressed by the pen-shaped pointer 3, on the other hand, the top image data is displayed in the display portion 4, and if the scroll bar 24 is pressed by the pen-shaped pointer 3, the last image data is displayed in the display portion 4. In this connection, the pen input detecting portion 2 detects the position of a point pressed by the pen-shaped pointer 3 based on the pressure applied to the point. It is therefore possible to actuate the MENU button 25, DEFINED button 26, CLEAR button 27 and others that have somewhat large areas, by pressing these buttons with fingers or the like having some areas.

While the touch switches are constituted by the combination of the sheet on which the scroll bars 21–24, MENU button 25, DEFINED button 26 and CLEAR button 27 are printed, and the pen input detecting portion 2, the size of the display portion 4 may have the size corresponding to the entire area of the pen input detecting portion 2, and the contents printed as described above may be displayed on the display portion 4 so as to provide the touch switches.

When the menu button 25 is pressed, the display portion 4 displays a screen as shown in FIG. 5 that allows selection of modes. In this display, indications 28–30 represent touch switches 28–30 for selecting respective modes, which switches consist of the indications and portions of the pen input detecting portion 2 that correspond to these indications. In this condition, if any one of the touch switches 28–30 in the display portion 4 is selected by the pen-shaped pointer 3 and the DEFINED button 26 is pressed, the selected mode is stored in the memory portion 6 or the like, and the mode is switched to the selected one. To the contrary, the selection is cancelled if the CLEAR button 27 is pressed.

The modes displayed when the MENU button 25 is pressed include those as shown in FIG. 5. While the selectable modes are displayed in FIG. 5 in the form of characters that read "RECORD", "REPRODUCTION" and "SETTING", these characters may be replaced by icons as described below which hint the contents of the modes.

(1) RECORD mode (icon display representing camera or video camera or the like, microphone, and pen)

(2) REPRODUCTION mode (icon display representing television, speaker and pen)

(3) SETTING mode (icon display representing switch)

Each of the above modes may be established by selecting the corresponding one in the above-described menu screen. Otherwise, the RECORD mode may be unconditionally established when the power supply is turned on, and any mode may be switched to a photographed image record mode as described later if the release button is half pressed. It is also possible to display in the screen a menu icon selected for switching whichever mode to the photographed image record mode without operating the release button.

Figure 10:
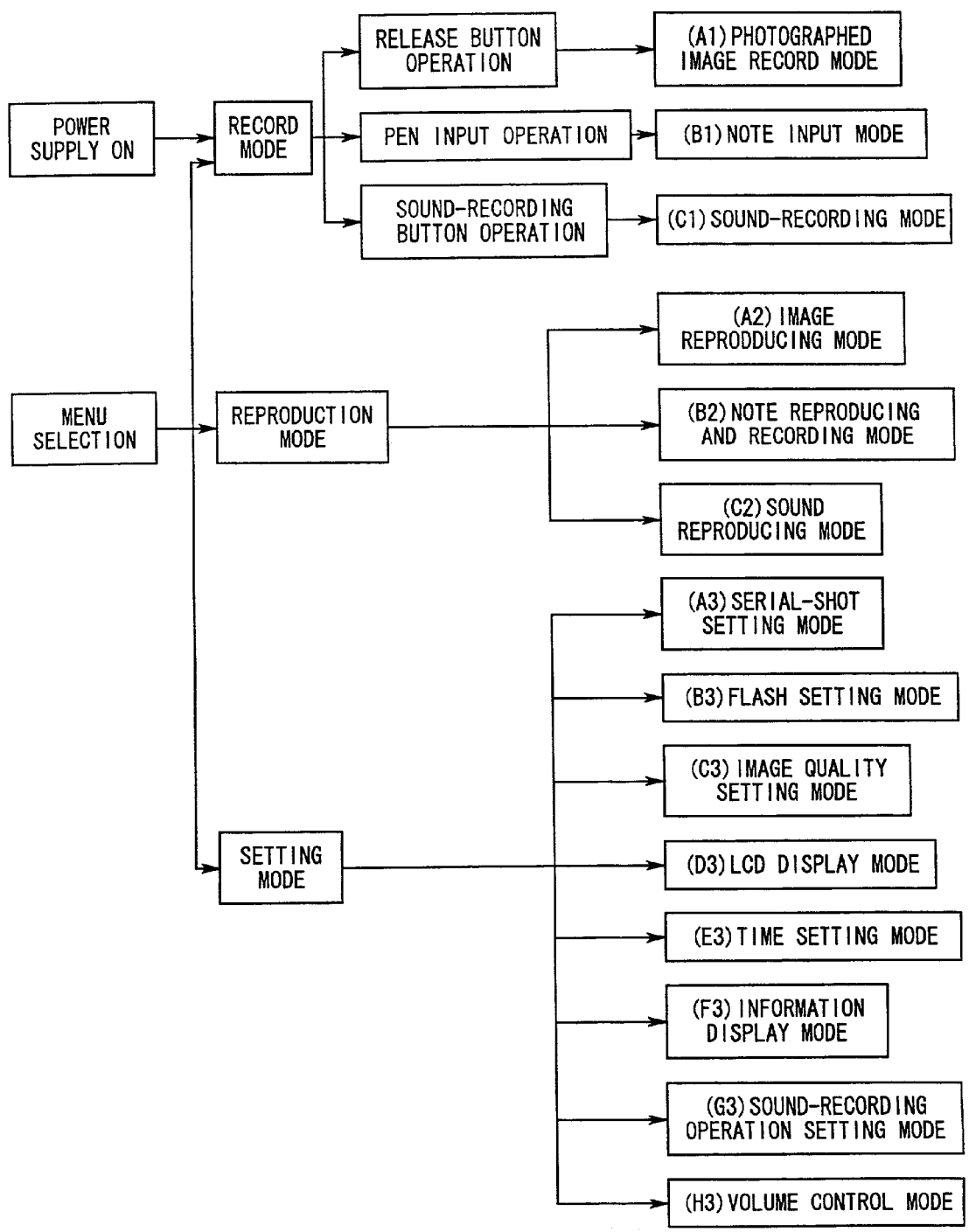
FIG. 10 is a view explaining the whole structure of respective modes set in the electronic camera of the third embodiment.

There will be next described each of the modes. FIG. 10 is a view explaining the whole construction of the respective modes.

(1) RECORD Mode

The RECORD mode is unconditionally established whenever the power supply switch of the electronic camera is pressed. The RECORD mode is further subdivided into three subordinate modes, i.e., (A1) photographed image record mode, (B1) note input mode, and (C1) sound-recording mode.

(A1) Photographed Image Recording Mode

This mode is established by operating the release button 12. Initially, the release button 12 is half pressed, and the display portion 4 starts displaying an image that has been formed (the timing in which the display portion 4 starts displaying can be changed as described later). If the release button 12 is fully pressed, the photographed image data are recorded in the memory portion 6. Thereafter, the photographed image data are kept displayed in the display portion 4 while the release button 12 is kept pressed (including both states in which the button is half pressed and fully pressed), and various information can be entered with the pen-shaped pointer 3 during that period of time. Once a hand is released from the release button 12, the image data entered with the pen and the photographed image data are recorded in the memory portion 6 such that these data are correlated with each other. If the CLEAR button 27 is pressed while the release button 12 is pressed, the display portion 4 displays a screen which requests selection of whether only the photographed image data are to be deleted, or only the pen input image data are to be deleted, or both of the image data are to be deleted. If any one of these is selected, the selected data are deleted from the display portion 4. In the SETTING mode as described later, it is possible to change from a single-shot mode to a serial-shot mode and vice versa. If the serial-shot mode is selected, pictures are serially taken while the release button 12 is fully pressed. Data cannot be entered with the pen while the pictures are serially taken.

In the SETTING mode can be also selected a setting in which the pen input mode is established for a predetermined period of time (e.g., 30 sec.) after the release button 12 is released or until the release button is half pressed next time, after the release button is fully pressed in the single-shot mode and the photographed image data are recorded. If the photographed image record mode is established, the image can be recorded by pressing the DEFINED button 26 of FIG. 5 with the pen in the same way in which the image is recorded by fully pressing the release button.

(B1) Note Input Mode

If a portion of the pen input detecting portion 2 that corresponds to a predetermined region of the display portion 4 is pressed by the pen-shaped pointer 3 after the power supply switch of the electronic camera is turned ON, the note input mode is established, and a palette (black, white, red) showing pen display colors is displayed at one corner of the screen. If the operator selects one of the colors in this palette, note data can be entered with the selected color. If the CLEAR button 27 is pressed, a screen is displayed again which confirms whether the note (pen input image data) is to be deleted or not, and the note is deleted after the confirmation. On the other hand, the note that has been entered is stored in the memory portion 6 at the point of time when the DEFINED button 26 is pressed. In the above-described note input mode, the photographed image or reproduced image is not displayed, and the note is entered with a blank background. In the SETTING mode as described later, it is also possible to set so as to automatically display the latest reproduced image as the back ground at the point of time when the note input mode is selected. In this case, the note thus entered is stored in the memory portion 6, such that the note is correlated with the reproduced image displayed as the background.

(C1) Sound-recording Mode

The sound-recording mode is established if the recording button 13 shown in FIG. 5 is pressed. Pictures can be taken during sound recording or after the sound recording for a predetermined time. It is also possible to record sound after taking pictures to the contrary. Recorded voice or other sound can be recorded in the memory portion 6 such that the voice is correlated with the image taken at the same time as the recording. It is, however, impossible to record voice between film frames used for photographing (regardless of the frames).

The recording mode is further subdivided into four subordinate modes as follows, and an appropriate mode is selected in the SETTING mode as described later.

(1) Mode in which sound is recorded while the recording button 13 is being pressed.

(2) Mode in which the sound recording is started when the recording button 13 is pressed once, and is stopped when the button is pressed again.

(3) Mode in which the sound recording is started when the recording button 13 is pressed only for a moment, and is terminated when the button is pressed again for a moment, while the recording continues during a period of time in which the recording button 13 is being pressed.

(4) Mode in which photographing is effected once the release button is pressed, and the sound recording continues during a period of time in which the release button is being pressed.

(2) REPRODUCTION Mode

Figure 6:
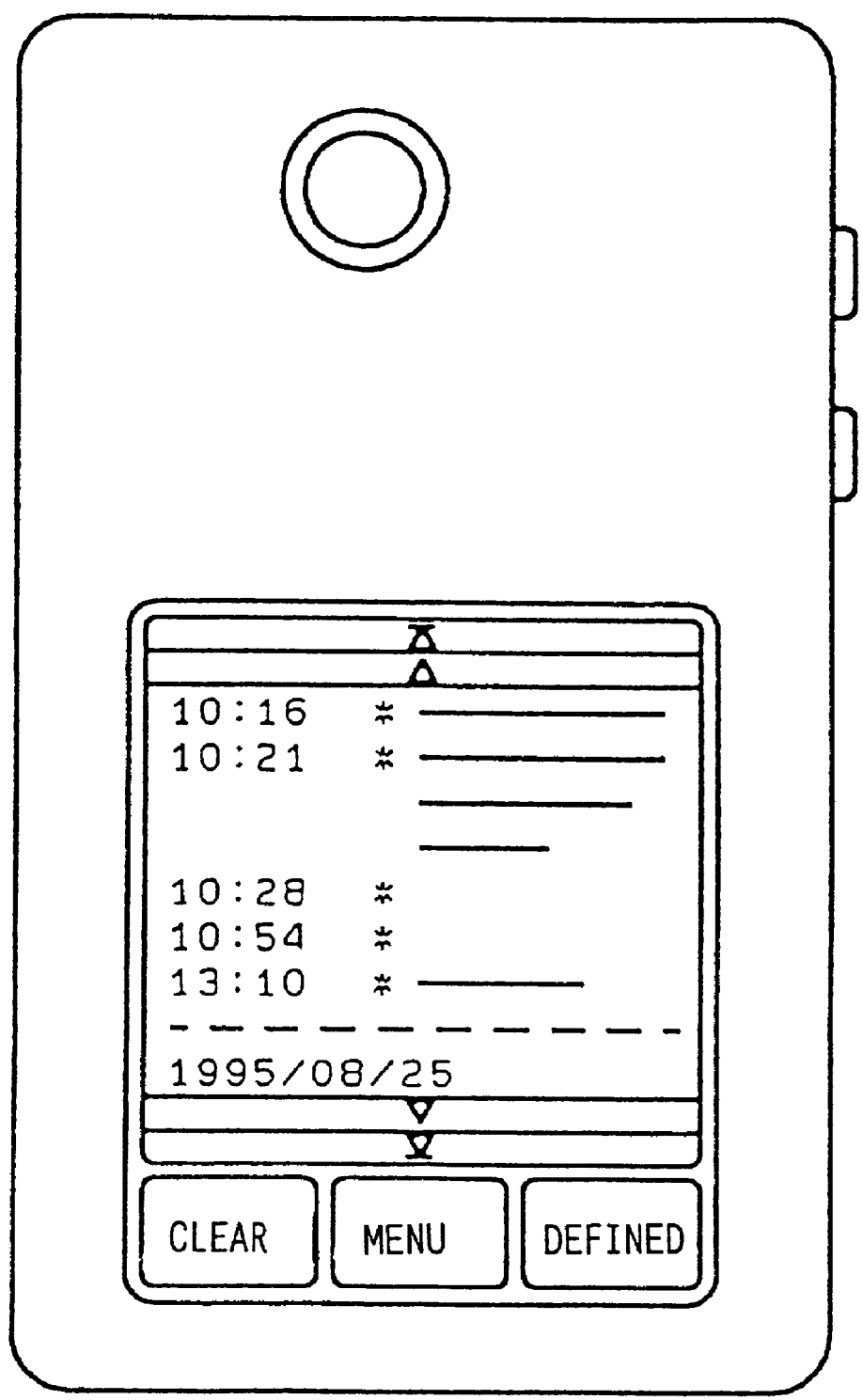
FIG. 6 is a view showing an example of thumbnail display displayed upon selection of a reproduction mode in the electronic camera of the third embodiment.
Figure 7:
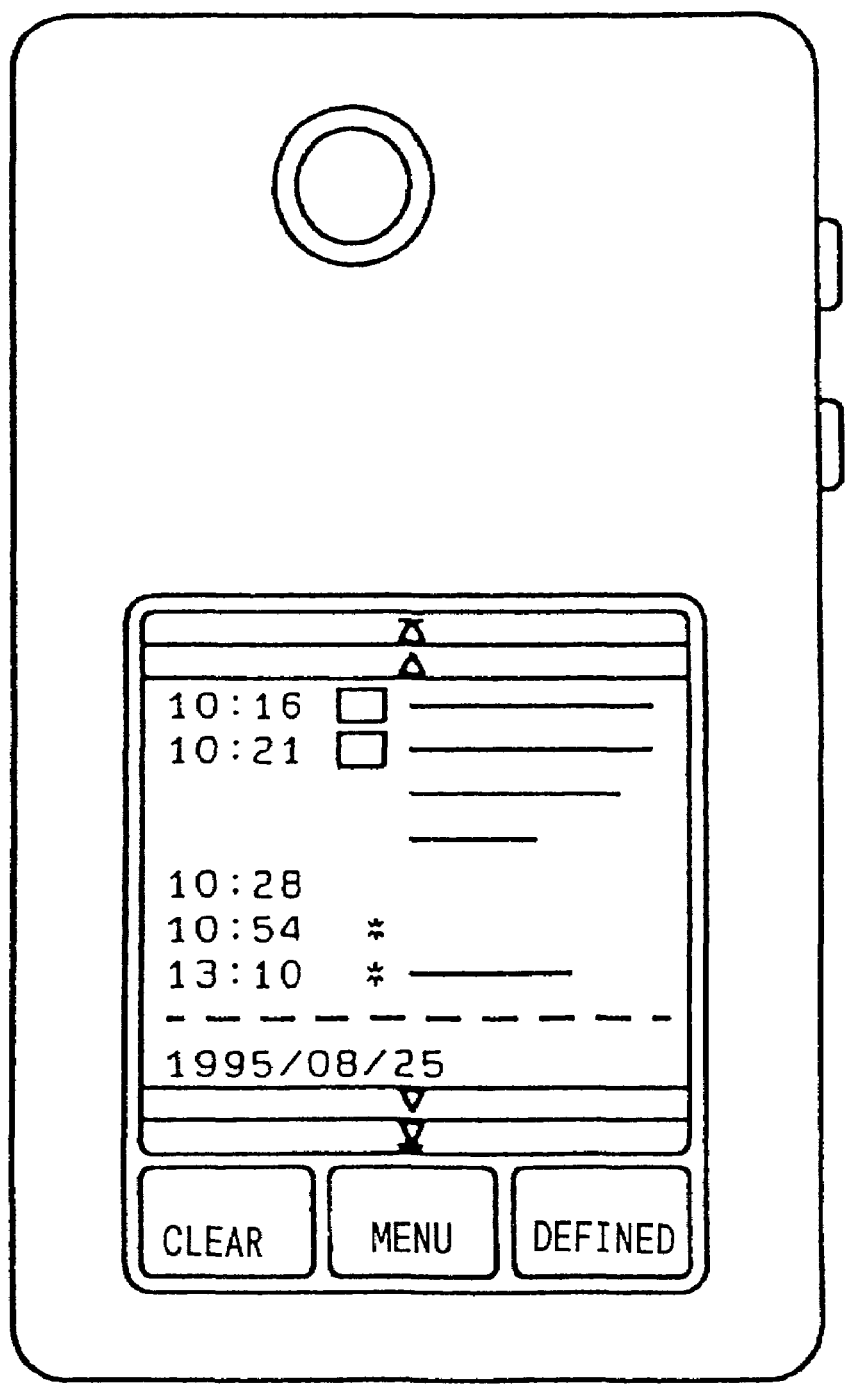
FIG. 7 is a view showing an example of thumbnail display displayed upon selection of the reproduction mode in the electronic camera of the third embodiment.
Figure 8:
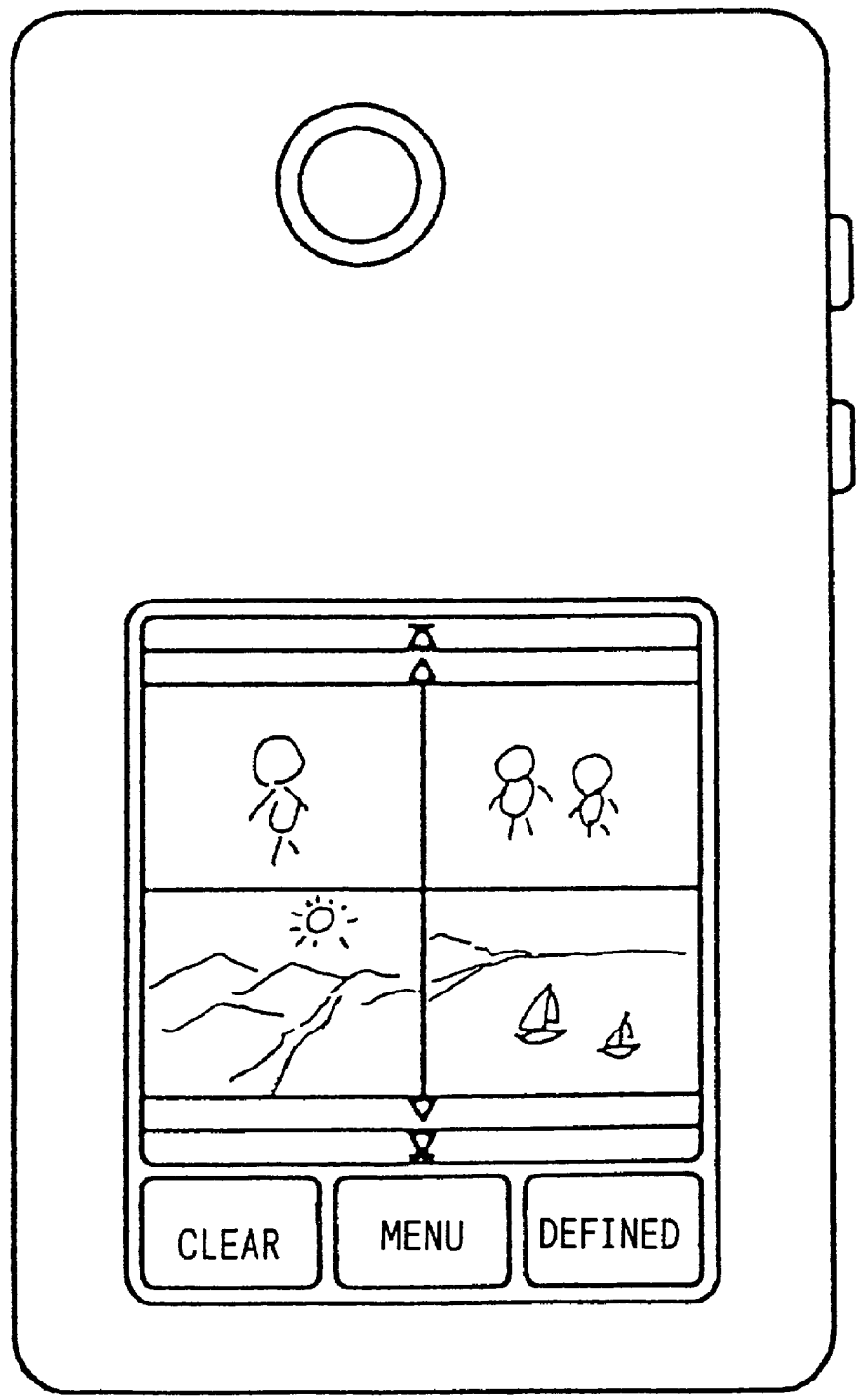
FIG. 8 is a view showing an example in which photographed images corresponding to four frames are displayed in divided regions upon selection of the reproduction mode in the electronic camera of the third embodiment.
Figure 9:
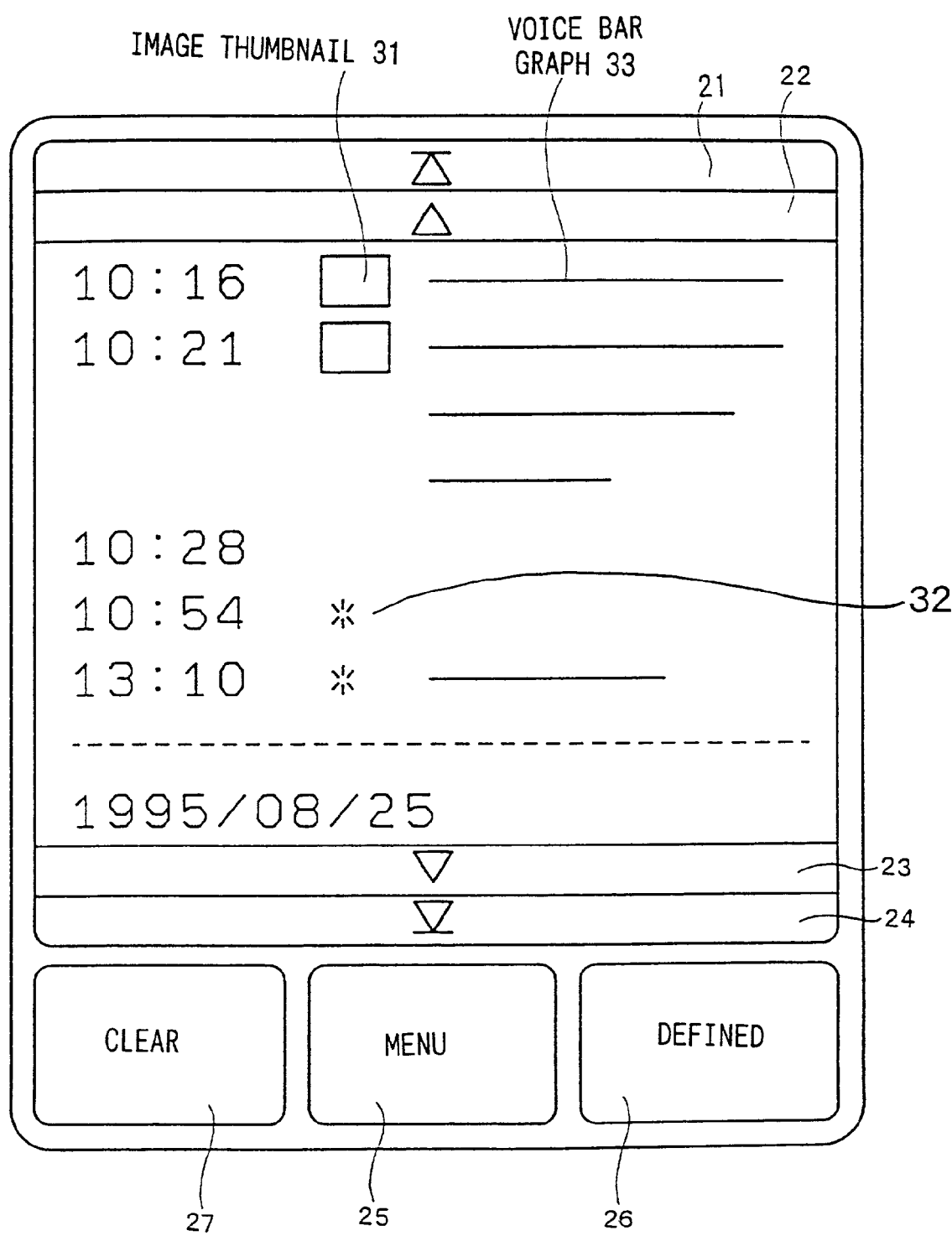
FIG. 9 is a view showing in enlargement a pen input detecting portion 2 (including a display portion 4) of FIG. 7.

The REPRODUCTION mode is established when the switch 29 for the REPRODUCTION mode, which is displayed when the MENU button 25 is pressed by the pen-shaped pointer 3, is pressed by the pen-shaped pointer 3. The REPRODUCTION mode is further subdivided into (A2) image reproducing mode, (B2) note reproducing and recording mode, and (C2) sound reproducing mode. If the REPRODUCTION mode is established, the display as shown in FIG. 6 or FIG. 7 is provided. FIG. 9 is a view showing in enlargement the pen input detecting portion 2 and display portion 4 of FIG. 7.

(A2) Image Reproducing Mode

Initially, the photographed image data that have been photographed and stored in the memory portion 6 are displayed in thumbnail form (displayed in reduced size) (reference numeral 31 in FIG. 9). If it takes time to provide the thumbnail display, a given symbol ("*" mark, for example) is displayed (reference numeral 32 in FIG. 9) for the moment, and the "*" mark for the image data that are ready to be displayed in the thumbnail form is then deleted and replaced by the thumbnail display, in the order in which the preparation for the thumbnail display is completed.

If the photographed image data corresponding to one frame is to be reproduced and displayed over the entire area of the display portion 4, a selected one of the regions in which the thumbnail display is provided or a selected one of the "*" marks is pressed by the pen-shaped pointer 3. Thus, the thumbnail image is positively displayed, causing the operator to recognize selection of the image data. If the operator then presses the DEFINED button 26 with the pen-shaped pointer 3, the photographed image corresponding to the selected thumbnail image is displayed over the entire area of the display portion 4.

If the photographed image data corresponding to four frames (FIG. 8) or nine frames are to be reproduced and displayed in the display screen 4, on the other hand, the thumbnail images or "*" marks corresponding to the four frames or nine frames are traced by the pen-shaped pointer 3, and the DEFINED button 29 is pressed so that the photographed images corresponding to the four frames (FIG. 8) or nine frames are displayed in divided areas over the entire display region of the display portion 4. In this condition, if one of the photographed images displayed in the divided areas is touched by the pen-shaped pointer 3, and the DEFINED button 26 is pressed, the selected photographed image is displayed over the entire display region of the display portion 4.

When a part of the pen input detecting portion 2 that corresponds to a certain region of the display portion is pressed by the pen-shaped pointer 3 while the photographed image on one frame is displayed in the display portion 4, a note can be entered with a pen, namely, a note can be written or drawn on the displayed photographed image. If the DEFINED button 26 is then pressed, the note is recorded as appended to the photographed image.

If the scroll bar 22 in the pen input detecting portion 2 is pressed by the pen-shaped pointer 3 while the photographed image on one frame is displayed in the displayed portion 4, the photographed image on a frame just before the above-indicated one frame is displayed. If the scroll bar 23 is pressed by the pen-shaped pointer 3, on the other hand, the photographed image on a frame just after the above-indicated one frame is displayed. If the scroll bar 21 is pressed by the pen-shaped pointer 3, the photographed image of the oldest frame that has been recorded in the memory portion 6 is displayed. If the scroll bar 24 is pressed by the pen-shaped pointer 3, the photographed image of the latest frame is displayed.

The photographed image data recorded in the memory portion 6 are deleted in the following manner. Initially, a part (one frame or a plurality of frames) of photographed images on a plurality of frames that are displayed in thumbnail form is selected by the pen-shaped pointer 3. As a result, the photographed image(s) on the selected one or plural frame(s) is/are negatively displayed (though not limited to the negative display if the image(s) can be distinguished from the other images). If the operator presses the CLEAR button 27 in this condition, the photographed image data corresponding to the selected frame(s) are deleted. When the image data in the memory portion 6 are deleted, it can be set whether only the photographed image data are to be deleted, or only the note (pen input image data) are to be detected, or both of these data are to be deleted.

(B2) Note Reproducing and Recording Mode

The note entered with the pen is reproduced such that it is superposed on the photographed image data related to the note. Another note may be entered in this condition. If the CLEAR button 27 is pressed, on the other hand, a screen is displayed to confirm whether the note is to be deleted or not, and the note is deleted after confirmation. The noted entered is stored in the memory portion 6 if the DEFINED button 26 is pressed. It is to be noted that a picture is not taken even if the release button 12 is fully pressed while the note is being entered.

(C2) Voice Reproducing Mode

When the reproduction mode is established, a screen as shown in FIG. 9 is displayed in the display portion 4. The photographed image is displayed in thumbnail form by the side of the time when the relevant picture was taken, and a bar graph representing voice is displayed by the side of the thumbnail display. If the DEFINED button 26 is pressed after the bar graph representing voice is pressed by the pen-shaped pointer 3, the voice is reproduced. The range that is pressed by the pen-shaped pointer 3 is kept reversed (the reversed display is not necessarily provided if it can be distinguished from the other bar graphs), and the reversed state is maintained unless another button or bar graph is pressed by the pen-shaped pointer 3, thus enabling the voice in the same portion to be reproduced any number of times by pressing the DEFINED button 26.

If the recording button 13 is pressed in the reproduction mode, the voice of the next bar graph is reproduced. It is also possible to serially reproduce a plurality of voices by pressing bar graphs representing these voices with the pen-shaped pointer 3. If the voice and image are to be reproduced at the same time, the DEFINED button 26 is pressed after the thumbnail image and the bar graph for the voice are pressed by the pen-shaped pointer 3. If the CLEAR button 27 is pressed while the bar graph is being reversed, the voice corresponding to the reversed bar graph is erased. In FIG. 9, the length of the bar graph is varied depending upon the recording time so that the recording time of the recorded voice can be recognized at a glance.

(3) SETTING Mode

When the MENU button 25 is pressed by the pen-shaped pointer 3, a switch 30 for the SETTING mode is displayed as shown in FIG. 5, and the SETTING mode is established if this switch 30 is pressed by the pen-shaped pointer 3. The SETTING mode is subdivided into eight subordinate modes, i.e., (A3) serial-shot setting mode, (B3) flash setting mode, (C3) image quality setting mode, (D3) LCD display mode, (E3) time setting mode, (F3) information display mode, (G3) sound-recording operation setting mode, and (H3) volume control mode. If the SETTING mode is selected, these modes are displayed in the display portion 4. Each of the above modes can be set by pressing with the pen an icon of a toggle switch displayed in the display portion 4. While the toggle switch is displayed in the form of the icon, this toggle switch may be merely represented by "O" when it is displayed. There are also displayed switches that correspond to respective items as explained below. Each of the items can be selected by pressing the corresponding switch with the pen-shaped pointer 3, or pressing a character portion representing each of the items with the pen-shaped pointer 3. If the MENU button 25 is pressed after one of the modes (A3)–(H3) is set, the currently set mode returns to the SETTING mode that is the previous mode to the current mode. Each of the modes will be hereinafter explained.

(A3) Serial-Shot Setting Mode

If the serial-shot setting mode in the display portion 4 is pressed by the pen-shaped pointer 3, "1 Single-Shot Mode" and "2 Serial-Shot Mode" are displayed in the display portion 4. If either of these is pressed by the pen-shaped pointer 3, the single-shot mode or serial-shot mode is selected.

(B3) Flash Setting Mode

If the flash setting mode in the display portion 4 is pressed by the pen-shaped pointer 3, "1 Auto", "2 Inhibit Flash" "3 Forced Flash" are displayed in the display portion 4. If any of these is pressed by the pen-shaped pointer 3, the mode is switched to the selected one of "Auto", "Inhibit Flash" and "Forced Flash". "Auto" is a mode in which flash light is automatically generated depending upon the brightness of an object, and "Inhibit Flash" is a mode in which the flash light is inhibited from being generated irrespective of the brightness of the object, while "Forced Flash" is a mode in which the flash light is generated irrespective of the brightness of the object.

(C3) Image Quality Setting Mode

If the image quality setting mode in the display portion 4 is pressed by the pen-shaped pointer 3, "1 High Resolution" and "2 Normal" are displayed in the display portion 4. If either of these is pressed by the pen-shaped pointer 3, the mode is switched to "High Resolution" or "Normal". If the "High Resolution" is selected, the images are displayed at high resolution when one frame of image is reproduced over the entire area of the display portion 4 or when four or nine frames of images are reproduced at the same time.

(D3) LCD Display Mode

If the LCD display mode in the display portion 4 is pressed by the pen-shaped pointer 3, "1 LCD Actuated by Half-pressing", "2 LCD Actuated in RECORD Mode", and "3 LCD Not Actuated in RECORD Mode" are displayed. If any of these is pressed by the pen-shaped pointer 3, the selected mode is established. In the (A1) photographed image recording mode as described above, it was explained that the power supply for the display portion 4 is turned on by half pressing the release button 12. This is in the case that "1 LCD Actuated by Half-pressing" is selected.

(E3) Time Setting Mode

If the time setting mode in the display portion 4 is pressed by the pen-shaped pointer 3, panels of "0" to "9" and panels of ":" and "/" are displayed. The date and time in the electronic camera can be initialized (or set) by selecting appropriate one(s) from these panels by means of the pen-shaped pointer 3.

(F3) Information Display Mode

If the information display mode in the display portion 4 is pressed by the pen-shaped pointer 3, various kinds of information, such as a remaining amount of battery, number of pictures that have been taken, and date and time, can be displayed for a sight.

(G3) Sound-recording Operation Setting Mode

If the sound-recording operation setting mode in the display portion 4 is pressed by the pen-shaped pointer 3, one mode can be selected from four kinds of modes as explained with respect to (C1) sound-recording mode.

(1) Mode in which sound recording is started when the recording button 13 is pressed, and is stopped when the button is released.

(2) Mode in which sound recording is started when the recording button 13 is pressed, and stopped when the recording button 13 is pressed again.

(3) Mode in which sound recording is started when the recording button 13 is pressed for a moment, and is stopped when the button is pressed again for a moment, and the recording continues if the recording button 13 is kept pressed and is terminated when the button 13 is released.

(4) Mode in which photographing is effected when the release button is pressed, and sound recording continues while the release button is being pressed.

(H3) Volume Control Mode

If the volume control mode in the display portion 4 is pressed by the pen-shaped pointer 3, "1 Volume Large", "2 Volume Middle", "3 Volume Small" and "4 Mute" are displayed in the display portion 4. Alternatively, a bar representing the volume of sound and a volume switch may be displayed, and the volume can be set from Mute (right) to Volume Large (left) by moving the position of the volume switch on the bar.

In the third embodiment as described above, the electronic camera is provided with a wide variety of modes for photographing, reproduction of photographed images, and setting of various conditions, and the operation for setting these modes is effected by the combination of the pen input detecting portion with the display in the display portion and the specially positioned print sheet. This eliminates a need to provide additional switches, dials or the like for designating the modes, thus leading to improved operating efficiency, reduced cost of the camera, and reduced number of steps for manufacturing the camera.

What is claimed is:

1. An electronic camera comprising:
an imaging element that converts an optical image that passes through a photographing lens into a digital image by operating a release switch to an ON state;
a display device capable of displaying said digital image;
a pen-type designator capable of designating an arbitrary position on a display screen of said display device;
a pen position detecting device that detects the position designated by said pen-type designator;
a pen trail display controller that causes said display device to display a movement trail of the detected designated position; and
a pen detection controller that inhibits said imaging element from forming an image of a next frame and allows said pen position detecting device to detect said designated position and allows said pen trail display controller to control display of said movement trail, while said release switch is kept operated to the ON state after the imaging element terminates forming an image of one frame, said pen detection controller enabling said imaging element to effect forming an image of the next frame when said release switch is thereafter operated to an OFF state.

2. An electronic camera according to claim 1, wherein said pen trail display controller causes said display device to display said movement trail being superposed on the digital image when allowed by said pen detection controller.

3. An electronic camera according to claim 2, further comprising:
a recording device capable of recording respective data corresponding to said digital image and said movement trail, said recording device recording said respective data corresponding to the digital image and the movement trail that are superposed on each other and displayed in said display device, together with additional information indicating that the data corresponding to the digital image are correlated with the data corresponding to the movement trail.

4. An electronic camera comprising:
an imaging element that forms an image of an object;
a display device that is provided on a side of the electronic camera opposite to a side of the electronic camera on which a photographing lens is provided and that displays said formed image;
a designating device that designates arbitrary positions on a display screen of said display device;
a memory that stores an image data file that includes image data of the image formed by the imaging element, the display device being capable of displaying the image by using the image data in the stored image data file, the memory also storing a designation data file that includes designation data corresponding to the designated positions, the display device being capable of displaying markings at the designated positions by using the designation data in the stored designation data file, the markings being displayed superimposed on the displayed image; and
the image data file and the designation data file are correlated to each other.

5. An electronic camera according to claim 4, wherein said designating device comprises a touch sensor that is superposed on said display screen of said display device and allows said display screen to be seen through the touch sensor.

6. An electronic camera according to claim 4, wherein said display device displays on said display screen control operation indications representing predetermined control operations for said camera,
said electronic camera further comprising a control device that, when at least one of positions of said control operation indications is designated by said designating device, controls said camera to perform corresponding one of said control operations.

7. An electronic camera according to claim 4, further comprising
a shutter release button that can be half pressed and fully pressed, and wherein
said display device starts displaying said image of said object that is formed by said imaging element when said shutter release button is half pressed.

8. An electronic camera according to claim 5, wherein said touch sensor extends in a region that is larger than said display screen.

9. An electronic camera according to claim 4, wherein said markings are displayed in a form of a trail of a designated position when said designated positions are successively designated by said designating device.

10. An electronic camera according to claim 7, further comprising
a control device that fixes said image that is being formed by said imaging element at a point of time when said shutter release button is fully pressed, and wherein
said display device displays said fixed image until said shutter release button is released after said shutter release button is fully pressed.

11. An electronic camera according to claim 8, wherein
control operation indications representing predetermined control operations of said camera are prepared in said region in which said touch sensor extends,
said camera further comprising
a control device that, when at least one of positions of said control operation indications is designated by said touch sensor, controls said camera to perform corresponding one of said predetermined control operations.

12. An electronic camera according to claim 11, wherein said control operation indications are disposed on a side of a lower surface of said touch sensor, and said region in which said touch sensor extends allows said control operation indications to be seen through said region.

13. An electronic camera according to claim 4, wherein said electronic camera has a recording mode in which said image data file and said designation data file are stored in said memory, and a reproduction mode in which said image data file and said designation data file are retrieved from said memory and reproduced on said display device, said electronic camera further comprising
a control device that utilizes a combination of display by said display device and designation by said designating device so as to enable switching between said recording mode and said reproduction mode.

14. An electronic camera according to claim 4, wherein said electronic camera has a designated position display/recording mode which permits display of said positions designated by said designating device and in which said designation data file of said designated positions is stored in said memory, and a photographing record mode which permits forming an image by said imaging element and permits display of said positions designated by said designating device and in which said image data file and said designation data file are stored together, said electronic camera further comprising
a control device that switches said camera to said designated position display/recording mode when a predetermined position is designated by said designating device.

15. An electronic camera according to claim 13, wherein said control device initially establishes said recording mode when a power supply of said electronic camera is turned on.

16. An electronic camera according to claim 4, wherein the image data file and the designation data file are correlated to each other with file names.

* * * * *